June 2, 1970  TADASHI SAITO ET AL  3,515,326
APPARATUS FOR CUTTING OF STEEL BARS
Filed May 17, 1968  6 Sheets-Sheet 1
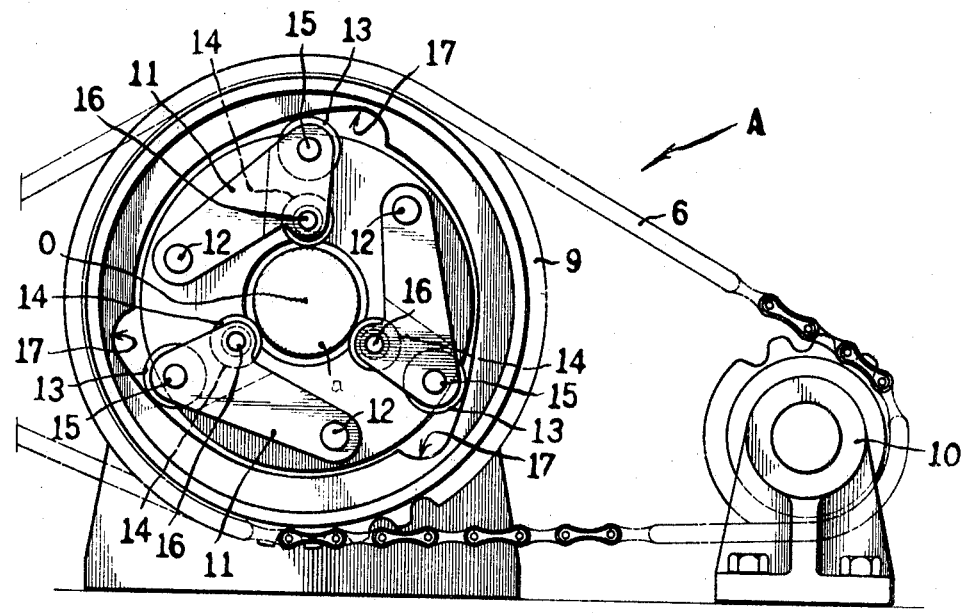
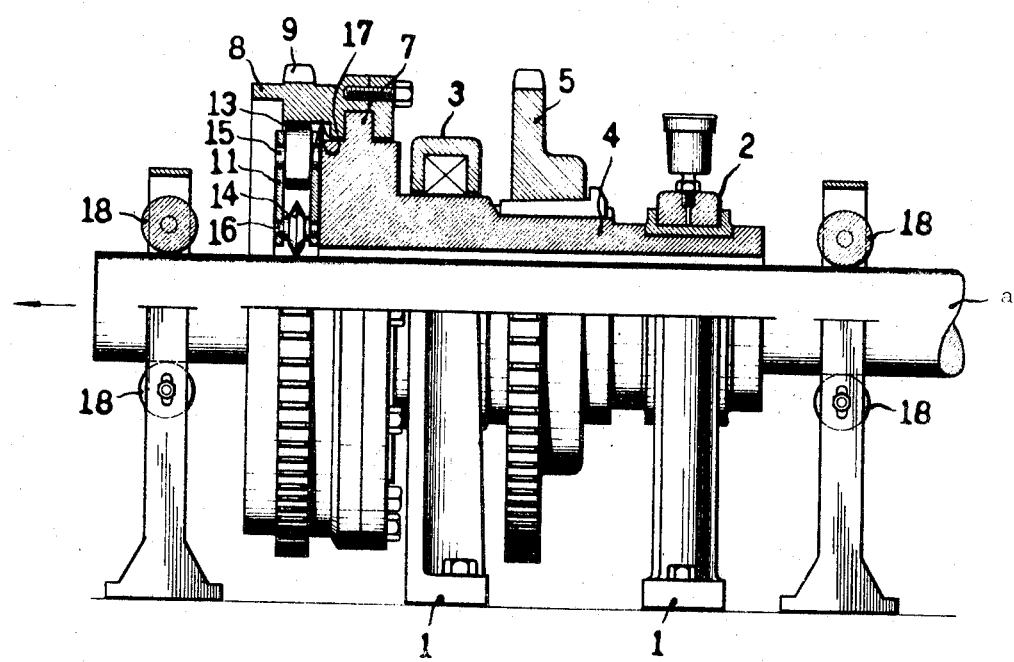

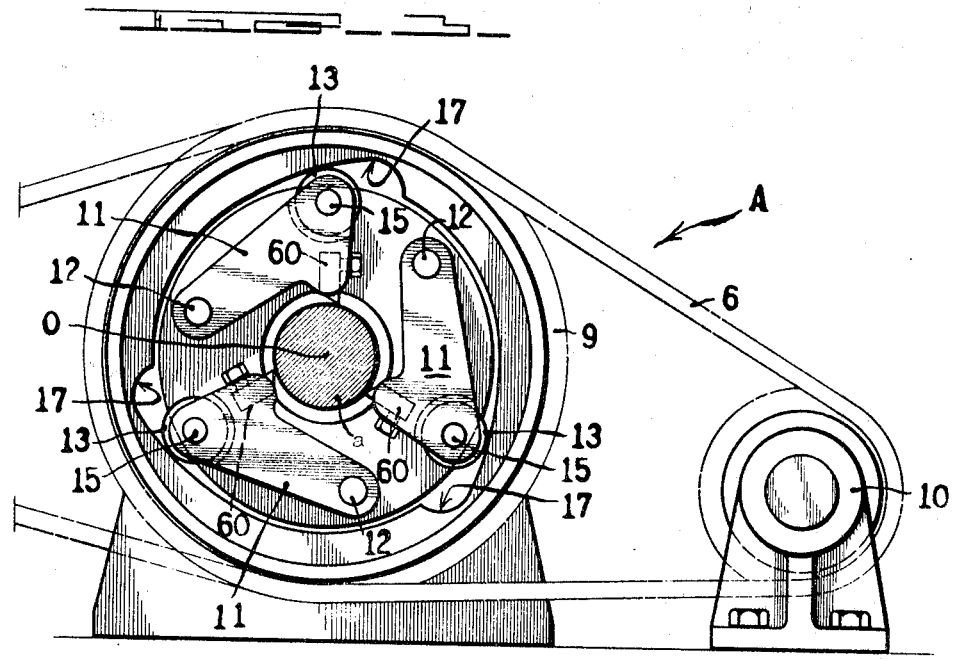
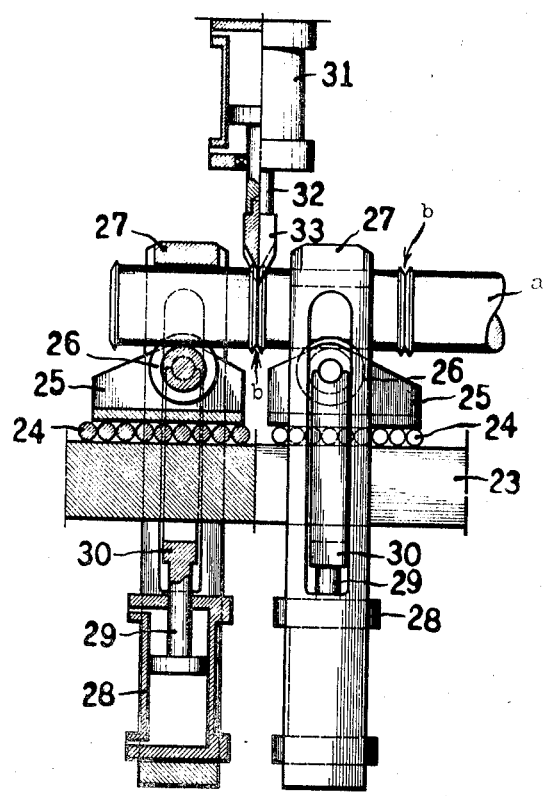

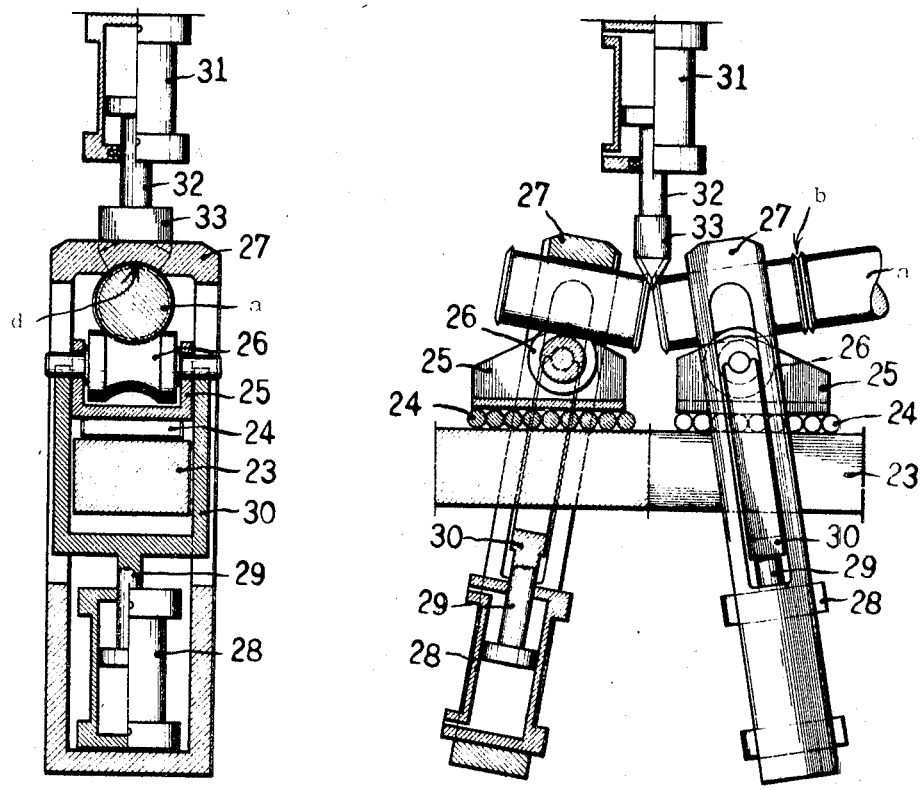
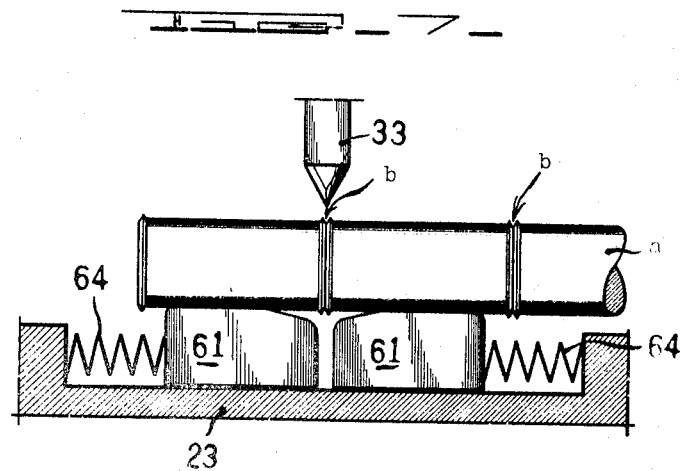

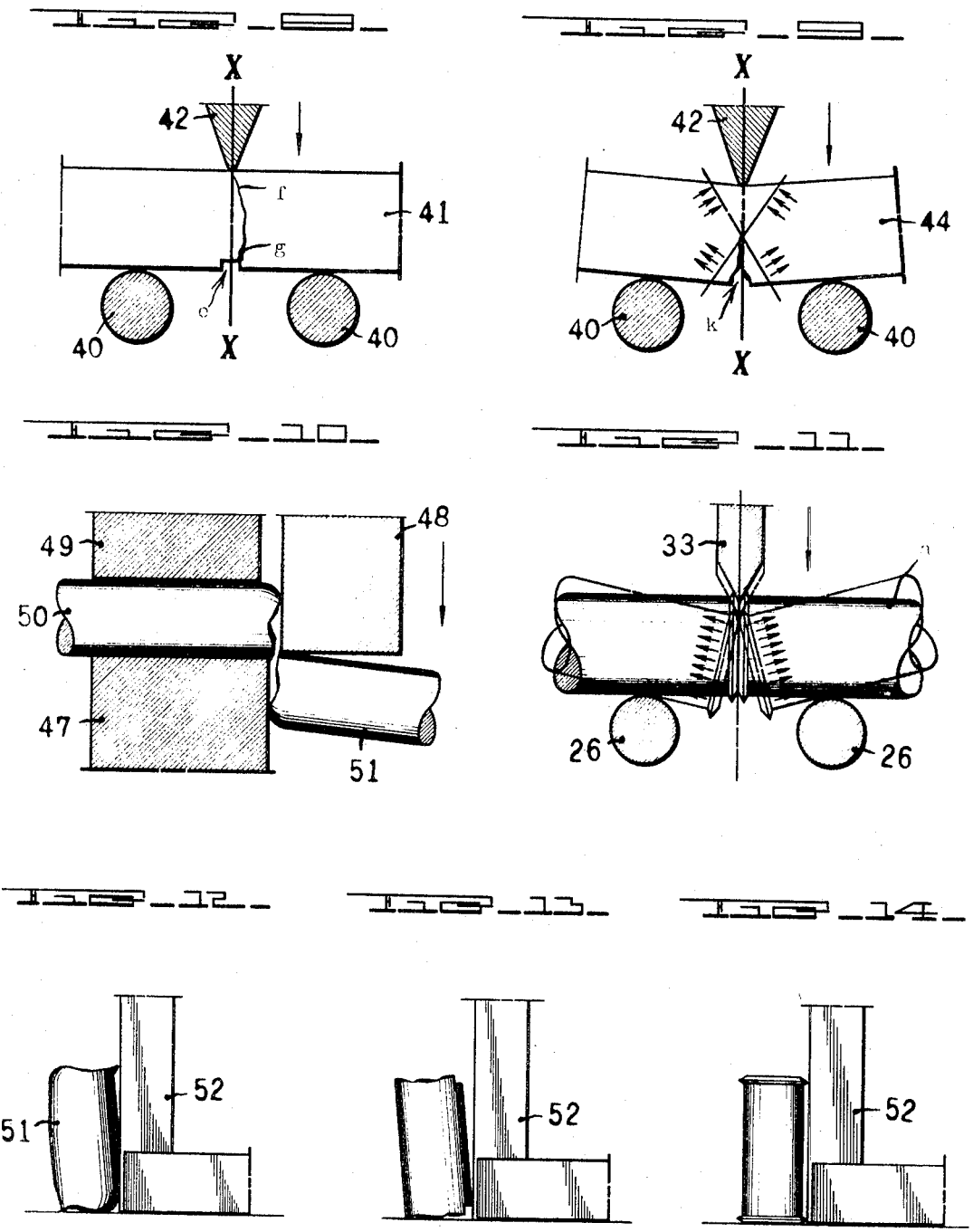

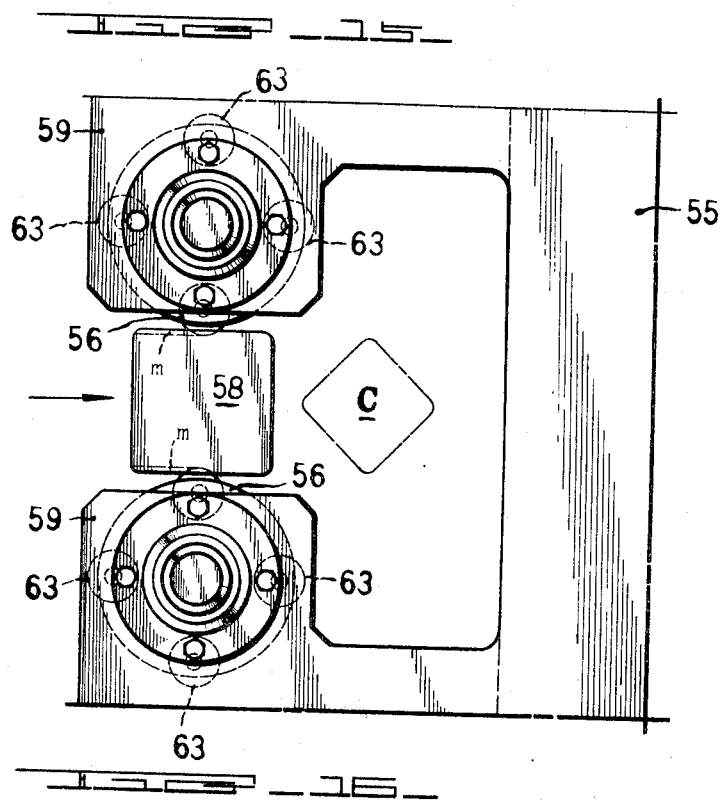
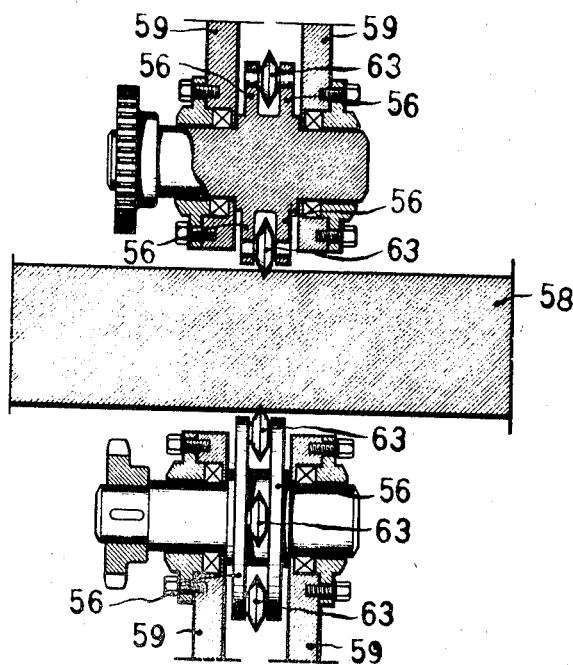

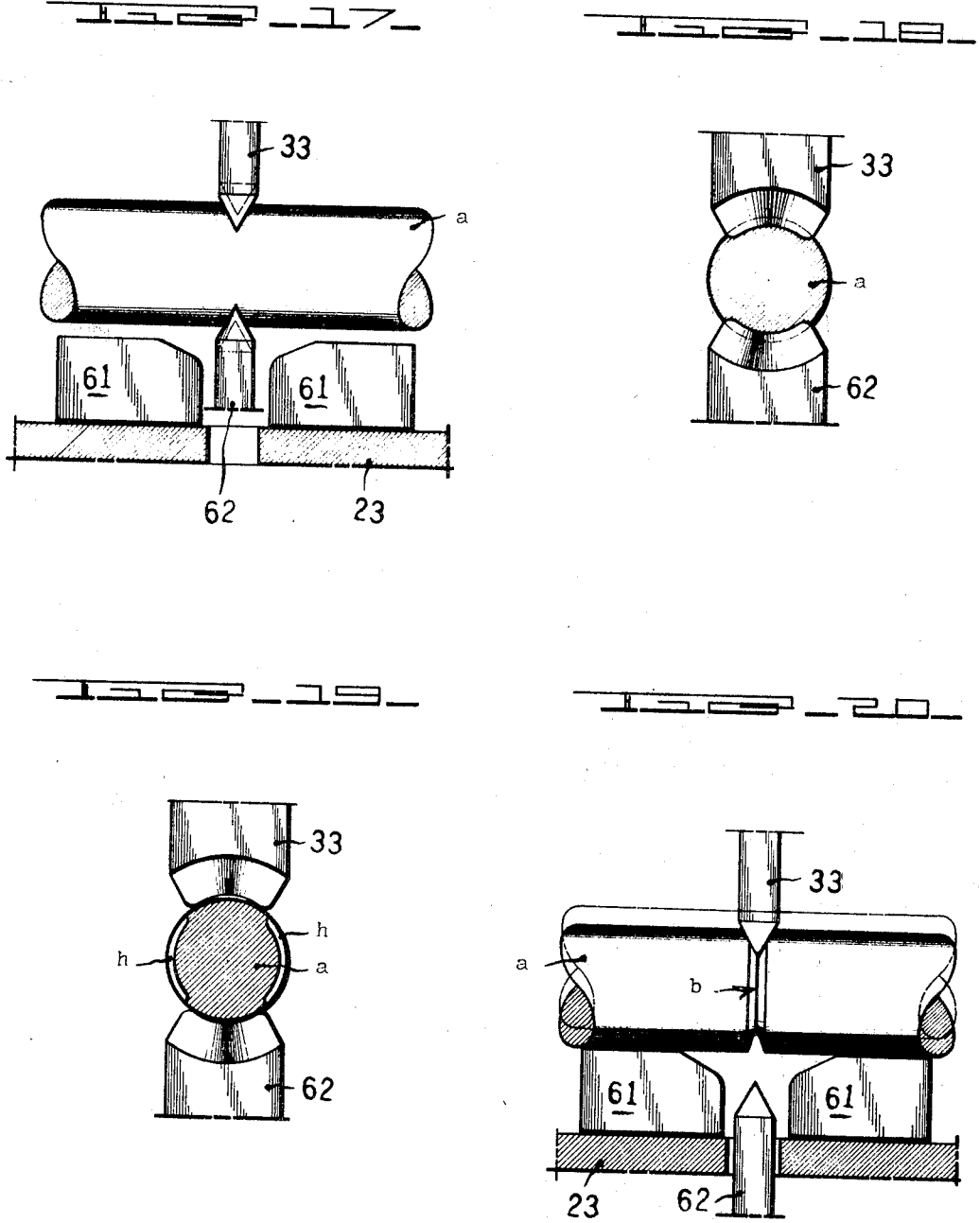

United States Patent Office 3,515,326
Patented June 2, 1970

3,515,326
APPARATUS FOR CUTTING OF STEEL BARS
Tadashi Saito, Masaya Saito, and Masaru Saito, Takarazuka, Japan, assignors of one-twelfth to Hachiro Saito, Takarazuka, Japan
Filed May 17, 1968, Ser. No. 730,132
Int. Cl. B26f 3/00
U.S. Cl. 225—96.5
8 Claims

ABSTRACT OF THE DISCLOSURE

By the method and apparatus for cutting off a steel bar, a V-shaped groove is first formed in the circumferential surface of the bar. Supported by two supporting members on the both sides of the groove, the steel bar is then pressed by a pressing member having a sharp V-shaped cutting edge which wedges into the groove, whereby due to the combination of the tearing action created by the driven pressing member and tensile and tearing actions effected in the opposite side by the bending of the bar, the steel bar is cut off at the grooved portion.

---

The present invention relates to an apparatus for cutting off steel bars.

In the primary step of all the working operations in industries, it is in general of extreme importance to cut off iron bars in desired dimensions, and for this purpose, there are at present various methods employed such as cutting off by lathe, abrasive cutting off, gas cutting and shearing. Although the shearing method is the most economical and the least time-consuming of these methods above described, the conventional method of shearing has been found defective with respect to the cut-off surfaces and accordingly, it is quite disadvantageous in that the method is not applicable to precision working.

FIG. 8 shows one of well-known methods of cutting off steel bars which is applicable not only to round steel bars but also to square steel bars. In this method, a steel bar 41 with a cut-out portion e formed in the circumferential surface thereof is pressed by a pressing cutting edge 42 on the opposite side of the cut-out portion, so that the steel bar supported on the supporting points 40 is bent by the cutting edge with the result that the concentrated load acting on the cut-out portion produces a crack therein which rapidly develops into breakage. In order to obtain desired materials, the breakage at this time should preferably take place along the line X—X, the line on which the pressure is exerted concentrically with resultant cut-off surfaces formed at a right angle with the axis of the steel bar, while eventually, the breakage is initiated in the corner of the cut-out portion e and developed obliquely toward f thereby resulting in a breakage not along the desired line X—X but as at g. Consequently, the right-hand cut-off piece obtained in the figure is smaller than is formerly intended with a larger left-hand piece, both involving resultant irregular ragged cut-off surfaces.

Furthermore, in accordance with the shearing method which is most extensively used at present, a steel bar 50 placed on a lower cutting edge 47 and clamped by a holding means 49 is sheared by an upper cutting edge 48 to obtain a cut-off material 51. In the shearing operation of this method, however, stresses such as tensile, compressive, straining forces act simultaneously or interrelatedly on the material to be cut off in complicated manner, so that the material is extremely deformed by being subjected to torsion, crushing, bending or tearing thus resulting in ragged, irregular cut-off surfaces which are not normal to the axis of the steel bar.

This has a grave influence upon precision forming. As well known, the first step of forging starts with a beating operation provided to the material which is placed upright. The material in this step, when placed vertically in upright position, is properly beaten to be supplied to the next step and a satisfactory product will be obtained. On the contrary, when the beating operation is given from above to the material obtained by the above-mentioned conventional method, namely, the material which is distinctly bent, damaged or deformed and which leans away from a triangle 52 due to the irregularities in the cut-off surface as shown in FIGS. 12 and 13, the inclined material is formed into an irregular or oval shape, instead of a regular circular form. Because of the irregular shape, the desired shape can not be obtained in the second step, nor is the defect in the subsequent steps and it is gradually aggravated until an unrecoverable defective product is obtained.

A principal object of the present invention is therefore to provide a novel method and apparatus for cutting off steel bars by which steel bars can be readily cut off into segments with extremely smooth cut-off surfaces exactly as intended with respect to the volume and weight.

Another object of the present invention is to provide a novel apparatus for cutting off steel bars having a groove forming device for successively forming suitably spaced apart annular V-shaped groove in an elongated continuous steel bar and a cutting-off device for rapidly cutting off the steel bar at the V-shaped groove and exactly along the predetermined cutting-off line.

Other objects and advantages of the present invention will readily be understood from the detailed description set forth below with reference to the accompanied drawings in which:

FIG. 1 is a side elevation showing an embodiment of a groove-forming device of a steel bar cutting-off apparatus in accordance with the present invention for forming an annular V-shaped groove in the circumferential surface of a round steel bar;

FIG. 2 is a cross sectional view taken along the line A—A in FIG. 1;

FIG. 3 is a side elevation showing an embodiment of another slightly modified groove forming device;

FIG. 4 is a cross sectional view of a cutting-off device for cutting off a round steel bar at the groove provided therein, said device being shown as viewed from the front;

FIG. 5 is a cross sectional view of the device shown in FIG. 3 taken along the line B—B therein;

FIG. 6 is a cross sectional view of the cutting-off device as viewed from the front showing the movement of respective members at the moment the cutting-off is effected;

FIG. 7 is a cross sectional view showing an embodiment of another cutting-off device as viewed from the front;

FIGS. 8 to 10 are views illustrating various manners of shearing or cutting-off as performed by conventional means;

FIG. 11 is a view illustrating a cutting-off operation as it is effected in accordance with the method of the present invention;

FIGS. 12 and 13 are views illustrating the shape of the cut-off materials obtained by a conventional method;

FIG. 14 is a view illustrating the form of the cut-off materials obtained by the method of the present invention;

FIG. 15 is a fragmentary front view partly in cross section showing an embodiment of a groove-forming device for forming a groove in square steel bar;

FIG. 16 is a cross sectional view taken along the line C—C in FIG. 14; and

FIGS. 17 to 20 are views showing another modified embodiment of the present invention.

An apparatus for cutting off steel bars in accordance with the present invention generally comprises a groove forming device A shown in FIGS. 1 and 2 or 3 and a cutting-off device B shown in FIGS. 4 to 6 or 7. The groove forming device A will be readily understood from the following description with reference to FIGS. 1 and 2.

A rotary main body 4 rotatably mounted on a main frame 1 with interposing bearings 2 and 3 is provided with a sprocket 5. The rotary main body 4 is adapted to be driven by the sprocket 5 which is connected operatively to a motor (not shown in the figure). On a flange portion 7 formed in the outer peripheral surface of one end of the rotary main body 4 is mounted rotatably a ring cam 8 which is operatively connected, by a sprocket 9 and a chain 6, to a motor 10 whose number of revolutions is adapted to be adjustable, the sprocket 9 being formed in the peripheral surface of the ring cam 8. On the surface of the end of the rotary main body 4, three cutter holding levers 11 are pivotally mounted by respective pins 12 in such manner that the levers 11 surround the axis 0 of the rotary main body 4. Pivotally mounted by pins 15 and 16 on each of the cutter holding levers 11 are a roller 13 and a disclike cutter 14, the roller 13 being kept in contact with the cam surface 17 formed in the inner peripheral surface of the ring cam 8. A round steel bar $a$ to be cut off is positioned in the central portion of the device A while being prevented from rotation. By means of feed rollers 18 the steel bar $a$ is adapted to be carried intermittently toward the left (i.e. in the direction indicated by the arrow) in the figure.

In forming a V-shaped annular groove in the round steel bar $a$ with the device, the rotary main body 4 and ring cam 8 are brought into rotation in the same direction (i.e. clockwise in the figure) and at the same speed, the former being driven by a motor (not shown) and the latter by the motor 10, whereupon the cutter holding levers 11, due to centrifugal force, are pivotally moved on the pins 12 toward the direction of the centrifugal force. Thus released, the round steel bar $a$ is then moved by the feed rollers 18 for the next operation of groove forming, and then it is firmly held by a holding mechanism to be hereinafter described.

As long as the rotary main body 4 and ring cam 8 are driven at the same speed no alteration is effected in the movement of the cutter holding levers 11. However when the relative speed ratio between the two is altered, the position of the rollers 13 relative to the cam surfaces 17 formed in the inner peripheral surface of the ring cam 8 is altered, so that the cutter holding levers 11 are pivotally moved on pins 12 toward or away from the circumferential surface of the round steel bar $a$.

Now in the drawing when the speed of the motor 10 driving the ring cam 8 is slightly stepped up, the ring cam 8 is moved forwardly of the rotary main body 4 thereby permitting the cam surfaces 17 to advance in the direction indicated by the arrow in the figure to push the rollers 13 down whereby the cutters 14 are pressed against the circumferential surface of the round steel bar $a$ while being rotated. Since the round steel bar $a$ at this time is not being driven, a V-shaped groove $b$ can readily be formed in the circumferential surface thereof with the cooperative operation of the three cutters 14. Upon finishing forming the V-shaped groove $b$ the rotary main body 4 and the ring cam 8 are synchronized by either accelerating the rotation of the rotary main body 4 or by slowing down the rotation of the ring cam 8 to thereby retreat the cam surfaces 17 and cutter holding levers 11 to the original position for the subsequent operation. Through carrying out the above described operation in repetition, V-shaped annular grooves are formed successively. Instead of cutters 14, cutting edges 60 as shown in FIG. 3 may be employed.

The round steel bar in which V-shaped grooves are thus formed are sent to the next step for cutting off to be provided at the grooved positions. An embodiment of the cutting-off device B will be hereinafter described in detail with reference to the FIGS. 4 to 6.

Each of the two receiving rollers 26 for supporting a round steel bar $a$ are rotatably mounted on respective two supporters 25 which are placed on a stationary base 23 with a number of rotatable rollers 24 interposed therebetween. Also provided are clamping frames 27 for securely holding the round steel bar $a$ to the receiving rollers 26 from above. The clamping frames extend downward across the round steel bar $a$ and receiving rollers 26 with oil pressure cylinders 28 provided in the lever end thereof. The compressive force created in the oil cylinders is adapted to upwardly press the axes 22 of the receiving rollers 26 through the plungers 29 and supporting members 30. By actuating the oil pressure cylinders, therefore, the round steel bar $a$ can be firmly held between receiving rollers 26 and clamping frames 27.

Inserted into a main oil pressure cylinder 31 supported by a firm supporting frame with a predetermined space apart from the stationary base 23 is the upper end of a plunger 32 supporting a pressing member 33 having a sharp edge of V-shaped cross section corresponding to the V-shaped groove $b$ formed in the round steel bar. The pressing member 33 can be vertically moved by operating the oil pressure cylinder 31.

As shown in FIG. 5 the cutting edge of the pressing member 33 is provided, when viewed from the front, with an arcuate recessed portion $d$ for the edge to snagly contact with approximately a quarter of the circumferential surface of the groove in the round steel bar $a$.

Referring to FIGS. 4 and 5, the round steel bar $a$ is placed on the receiving rollers 26 with the groove $b$ positioned centrally thereof and securely held between the supporting members 30 and receiving rollers 26 by operating the oil pressure cylinders 28. When the pressing member 33 is forcibly pushed down by actuating the main oil pressure cylinder 31, the V-shaped edge corresponding the shape of the groove $b$ fits into the groove thereby wedging into the groove. At the same time, being supported by the two receiving rollers 26 and depressed by the pressing member 33 in the middle portion thereof, the round steel bar $a$ is subjected to a bending action. In case the round steel bar $a$ is bent under such conditions, the groove portion in the opposite side of the pressing member 33 receives tearing force due to the tensile action created by the bending action, thus resulting in a fracture which rapidly develops into entire tearing breakage of the steel bar. In this way a desired cutting-off operation is effected. Since, during this operation, the receiving rollers 26 and clamping frames 27 supporting the round steel bar in cooperation with the rollers 26 are as shown in FIG. 6 moved away from each other in the longitudinal direction of the steel bar $a$, the cutting-off operation can be carried out smoothly.

In accordance with the present invention wedging and tearing actions are created by driving the pressing member 33 into the grooved portion in the steel bar $a$ which is supported by the receiving rollers 26. While in the opposite side tearing force is exerted due to the tensile action attributable to bending. This results in tensile and tearing action effected exactly in the desired portion as indicated by the line X—X where the steel bar $a$ is to be cut off. More particularly, the tearing action takes place in the bottom portion of the V-shaped groove where the cross section of the round steel bar *a* is smallest and the steel bar *a* is least resistant against combined tensile forces and weakest against concentrated loading, so that the breakage occurs exactly along the previously determined line X—X without taking place in a portion deviated from the line X—X which is the case with a conventional method previously illustrated with respect to FIGS. 8 and 9. Moreover, the ruptured surfaces are smooth and perpendicular to the axis of the divided material and satisfactory cut-off materials are made obtainable which can be placed exactly upright along the triangle 52 as shown in FIG. 14. By the above described apparatus, a rapid and economical cutting operation can be carried out and yet the materials can be cut off exactly as predetermined with respect to volume and weight with smooth cut-off surfaces ensured.

The cutting-off device B may also be constructed in a structure as illustrated in FIG. 7. In this embodiment, the two supports 61 are slidably mounted on a stationary base 23 the one end portion of each supporter 61 being pressed against each other by means of springs 64. The upper edge portions facing toward each other of the supporters 61 are cut out thereby forming smoothly curved surfaces. When the steel bar *a* is bent by the pressing member 33, the force created is exerted on the springs 64 to move the two supporters 61 away from each other thus ensuring effective cutting-off operation of the steel bar.

FIGS. 15 and 16 show an embodiment of a device for forming a V-shaped groove in the circumferential surface of a steel bar having a square cross section. In this embodiment, in opposite extending portions 59 of a [-shaped frame 55 are provided two rotary bodies 56 which mount a number of disclike cutters 63 in freely rotatable manner. The rotary bodies are operatively connected to a suitable power source so as to rotate in directions opposite to each other as indicated by the arrow in the figure. A groove *m* is formed by the cutters 57 in the opposite side surfaces of a square steel bar 58 to be cut off either by feeding the steel bar 58 between the rotary bodies 56 in the direction shown by the arrow or by moving the frame 55 in the reverse direction. Upon finishing forming the groove, the square steel bar 58 is turned by 90 degrees in the position C as indicated in the imaginary line and then it is fed in the opposite direction to the above-mentioned thus providing the grooves in the four side surfaces. In this case also, sticklike cutters may of course be employed in place of the disclike cutters 63.

In FIGS. 17 to 20 there is shown another modified embodiment of the present invention. In accordance with this embodiment a receiving cutting edge 62 similar in shape to the pressing member 33 is disposed below the pressing member 33 and in a position opposite thereto, the receiving cutting edge passing through the stationary base 23. As in the case of the pressing member, the receiving cutting edge 62 is adapted to be fixed in a stationary position or to be movable up and down. Therefore, by pressing the circumferential surface of the steel bar *a* from thereabove or therebelow by means of the pressing member 33 and the receiving cutting edge 62 as shown in FIGS. 17 and 18, arcuate grooves can be formed in the upper and lower surfaces of the steel bar *a*. When the similar operation is provided on the steel bar upon rotating it by 90 degrees as shown in FIG. 19, a desired V-shaped annular groove can be formed. The receiving cutting edge 62 is then moved down and by pressing down the pressing member 33 once again as illustrated in FIG. 20, the cutting-off operation of the steel bar as described in detail can be effected.

Although the present invention has been described in detail with respect to its objects, advantages and typical embodiments to accomplish these, it is to be understood that the present invention is not limited to such embodiments but it also resides in all of the substitutes, alterations and equivalents without departing from what is claimed and the spirit of the inventors.

For instance, the annular V-shaped groove to be formed prior to the cutting-off operation can be provided, instead of employing the device herein disclosed in detail, by any other means such as by a lathe or the like, which is of course involved in the present invention.

What we claim is:

1. An apparatus for cutting off a steel bar comprising a pair of supporters for receiving the steel bar mounted on a stationary base so as to be movable in directions opposite to each other and always pressed toward each other by springs, at least the upper end portions of said supporters adjacent to each other being cut out in round shape, and a pressing member having a sharp cutting edge of V-shaped cross section and positioned between said supporters and above steel bar to be cut off, said pressing member being adapted to move upward and downward by a suitable power source.

2. An apparatus for cutting off a steel bar comprising a pair of supporters having receiving rollers for receiving the steel bar to be cut off and placed on a stationary base so as to be movable in directions opposite to each other, a pair of clamping frames for securely holding the steel bar to be cut off in cooperation with said receiving rollers, and a pressing member having a sharp cutting edge of V-shaped cross section, said pressing member being positioned between said supporters and above the steel bar to be cut off and adapted to move upward and downward by a suitable power source.

3. An apparatus for cutting off a steel bar as claimed in claim 2 wherein said clamping frames extend downwardly across the steel bar to be cut off, the lower ends of said clamping frames being provided with oil pressure cylinders having plungers upwardly extending and connected to supporting members for supporting the axes of said receiving rollers whereby through operating said oil pressure cylinders plungers are moved upward to push up said receiving rollers thereby securely holding the steel bar to be cut off between said receiving rollers and clamping frames.

4. An apparatus for cutting off a steel bar as claimed in claim 1 wherein said pressing member having a sharp cutting edge in V shape is formed of a sheet and provided with an arcuate recessed portion for contacting snagly with approximately a quarter of the circumferential surface of the V-shaped annular groove formed in the circumferential surface of the round steel bar to be cut off.

5. An apparatus for cutting off a steel bar as claimed in claim 1 wherein is provided a groove forming device comprising a rotary main body rotatably supported by the stationary base and having the round steel bar to be cut off passing through the central portion thereof, groove forming edges mounted on one side surface of said rotary main body so as to surround the round steel bar to be cut off and to move in the centrifugal direction due to the centrifugal force during rotation, and a ring cam having in the inner surface thereof a cam for pressing said groove forming edges against the circumferential surface of the round steel bar and disposed concentrically with said rotary main body but adapted to be rotated in the same direction as said rotary main body by a driving means other than said rotary main body, the position of the cam in relation to the groove forming edges in said ring cam being adapted to be altered by the alteration in the relative speed of rotation between said rotary main body and ring cam whereby an annular groove is formed by said groove forming edges forcibly pressed against the circumferential surface of the round steel bar.

6. An apparatus for cutting off a steel bar as claimed in claim 5 wherein each of said groove forming edges is supported by a holding lever pivotally mounted in the one side portion of said rotary main body and said holding lever has a guide roller in contact with the cam surface of said ring cam.

7. An apparatus for cutting off a steel bar as claimed in claim 5 wherein said ring cam is rotatably supported by a flange portion formed in the peripheral surface of one end of said rotary main body.

8. An apparatus for cutting off a steel bar as claimed in claim 2 wherein said pressing member having a sharp cutting edge in V shape is formed of a sheet and provided with an arcuate recessed portion for contacting snagly with approximately a quarter of the circumferential surface of the V-shaped annular groove formed in the circumferential surface of the round steel bar to be cut off.

References Cited

UNITED STATES PATENTS

| | | | |
|---|---|---|---|
| 1,187,384 | 6/1916 | Pecard-Chauveau | 225—104 X |
| 1,704,872 | 3/1929 | Schlenstedt | 225—104 X |

JAMES M. MEISTER, Primary Examiner

U.S. Cl. X.R.

225—104, 105